United States Patent
Hughes et al.

(10) Patent No.: US 7,307,237 B2
(45) Date of Patent: Dec. 11, 2007

(54) HAND-HELD LASER WELDING WAND NOZZLE ASSEMBLY INCLUDING LASER AND FEEDER EXTENSION TIPS

(75) Inventors: Thomas M. Hughes, Greer, SC (US); Clyde R. Taylor, Laurens, SC (US); James N. Brown, Lyman, SC (US)

(73) Assignee: Honeywell International, Inc., Morristown, NJ (US)

( * ) Notice: Subject to any disclaimer, the term of this patent is extended or adjusted under 35 U.S.C. 154(b) by 2 days.

(21) Appl. No.: 11/324,107

(22) Filed: Dec. 29, 2005

(65) Prior Publication Data

US 2007/0151957 A1    Jul. 5, 2007

(51) Int. Cl.
*B23K 26/20* (2006.01)
*B23K 26/14* (2006.01)

(52) U.S. Cl. ............................. 219/121.63; 219/121.84

(58) Field of Classification Search ........... 219/121.63, 219/121.84
See application file for complete search history.

(56) References Cited

U.S. PATENT DOCUMENTS

| | | | |
|---|---|---|---|
| 3,383,491 A | 5/1968 | Muncheryan | |
| 3,392,261 A | 7/1968 | Schollhammer | |
| 3,464,534 A | 9/1969 | Muncheryan | |
| 3,622,743 A | 11/1971 | Muncheryan | |
| 3,786,907 A | 1/1974 | Muncheryan | |
| 4,555,610 A | 11/1985 | Polad et al. | |
| 4,564,736 A | 1/1986 | Jones et al. | |
| 4,607,150 A | 8/1986 | Bannister | |
| 4,685,202 A | 8/1987 | Booth et al. | |
| 4,782,496 A | 11/1988 | Couturier | |
| 5,239,552 A | 8/1993 | Okuyama et al. | |
| 6,130,405 A | 10/2000 | Loringer | |
| 6,213,998 B1 | 4/2001 | Shen et al. | |
| 6,774,338 B2 * | 8/2004 | Baker et al. | 219/121.64 |
| 7,012,216 B2 * | 3/2006 | Baker et al. | 219/121.63 |
| 7,112,761 B2 * | 9/2006 | Hughes et al. | 219/121.84 |
| 2002/0104834 A1 | 8/2002 | Mangiarino et al. | |
| 2005/0103756 A1 * | 5/2005 | Baker et al. | 219/121.63 |
| 2005/0133486 A1 * | 6/2005 | Baker et al. | 219/121.63 |

FOREIGN PATENT DOCUMENTS

| | | | |
|---|---|---|---|
| JP | 2-20682 A | * | 1/1990 |
| JP | 7-256478 A | * | 10/1995 |

* cited by examiner

*Primary Examiner*—Geoffrey S. Evans
(74) *Attorney, Agent, or Firm*—Ingrassia Fisher & Lorenz

(57) ABSTRACT

A hand-held laser welding wand includes a main body that is dimensioned to be grasped by a hand and a nozzle assembly. The nozzle assembly includes a laser extension tip and a feeder material extension tip in a configuration that provides the hand-held laser welding wand with the capability of conducting laser welding operations in relatively deep crevices or other hard to reach places.

20 Claims, 7 Drawing Sheets

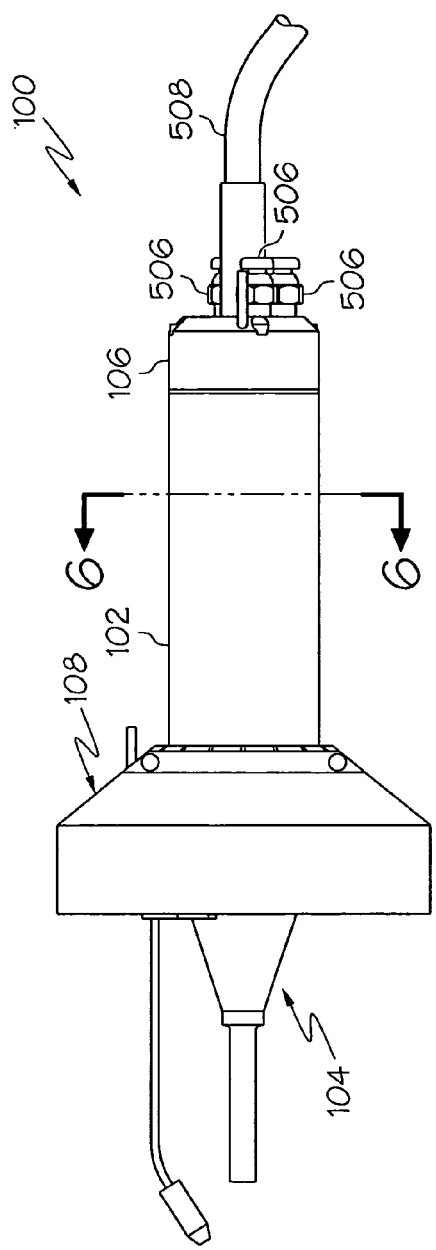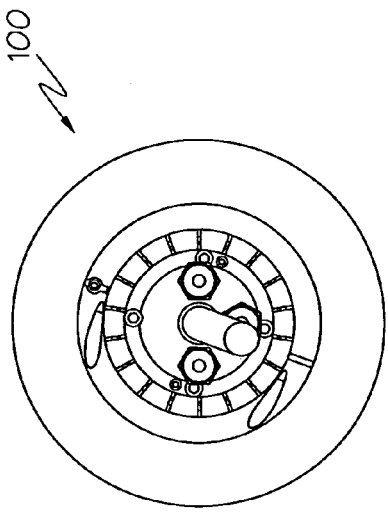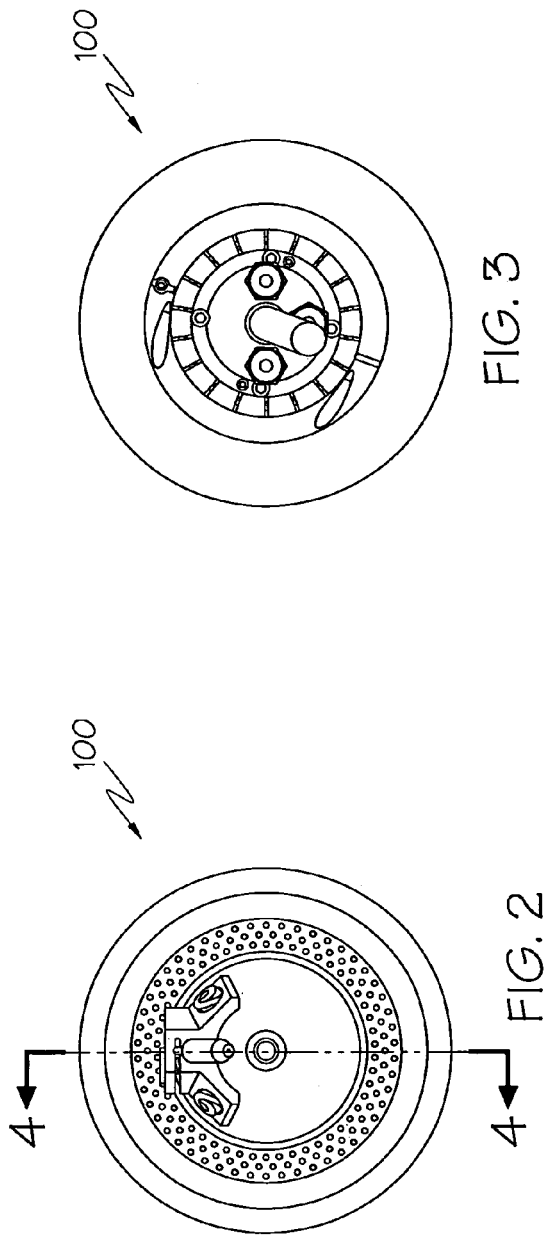

HAND-HELD LASER WELDING WAND NOZZLE ASSEMBLY INCLUDING LASER AND FEEDER EXTENSION TIPS

FIELD OF THE INVENTION

The present invention relates to laser welding and, more particularly, to a hand-held laser welding wand that includes a nozzle assembly that allows welding into deep crevices or hard to reach places.

BACKGROUND OF THE INVENTION

Many components in a jet engine are designed and manufactured to withstand relatively high temperatures. Included among these components are the turbine blades, vanes, and nozzles that make up the turbine engine section of the jet engine. In many instances, various types welding processes are used during the manufacture of the components, and to repair the components following a period of usage. Moreover, various types of welding technologies and techniques may be used to implement these various welding processes. However, one particular type of welding technology that has found increased usage in recent years is laser welding technology.

Laser welding technology uses a high power laser to manufacture parts, components, subassemblies, and assemblies, and to repair or dimensionally restore worn or damaged parts, components, subassemblies, and assemblies. In general, when a laser welding process is employed, laser light of sufficient intensity to form a melt pool is directed onto the surface of a metal work piece, while a filler material, such as powder, wire, or rod, is introduced into the melt pool. Until recently, such laser welding processes have been implemented using laser welding machines. These machines are relatively large, and are configured to run along one or more preprogrammed paths.

Although programmable laser welding machines, such as that described above, are generally reliable, these machines do suffer certain drawbacks. For example, a user may not be able to manipulate the laser light or work piece, as may be needed, during the welding process. This can be problematic for weld processes that involve the repair or manufacture of parts having extensive curvature and/or irregular or random distributed defect areas. Thus, in order to repair or manufacture parts of this type, the Assignee of the present application developed a portable, hand-held laser welding wand. Among other things, this hand-held laser welding wand allows independent and manual manipulation of the laser light, the filler material, and/or the work piece during the welding process. An exemplary embodiment of the hand-held laser welding wand is disclosed in U.S. Pat. No. 6,593,540, which is entitled "Hand Held Powder-Fed Laser Fusion Welding Torch," and the entirety of which is hereby incorporated by reference.

The hand-held laser welding wand, such as the one described above, provides the capability to perform manual 3-D adaptive laser welding on workpieces of differing types, materials, and configurations. Hence, filler media of various types and forms is supplied to the weld area on a workpiece. In addition, many laser welding processes are conducted in the presence of an inert shield gas. Thus, gas may need to be supplied to the hand-held laser welding wand during some welding processes. Moreover, during operation of the hand-held laser welding wand, the wand may heat up. Thus, a way of cooling the wand may be needed. With conventional laser welding devices, external supplies of gas, coolant, and filler media are coupled to the devices via external conduits, tubing, and/or wiring. Such external systems and supply devices can make the use of the hand-held laser welding wand cumbersome, these systems and supply devices can impair an operator, and/or can interfere with the wand operations.

In response to the above-noted needs, the Assignee of the present application invented a hand-held laser welding wand that can be used to supply various types and forms of filler media to a workpiece via various types of delivery systems, and that can be supplied with gas and/or coolant in a manner that is not cumbersome, does not impair wand operability, and does not interfere with wand operations. This invention is disclosed in U.S. Pat. No. 7,012,215, which is entitled "Hand-Held Laser Welding Wand Having Internal Coolant and Gas Delivery Conduits," and the entirety of which is hereby incorporated by reference.

Although quite effective in meeting each of the above-stated goals, the inventive wand also evidences certain drawbacks. For example, its configuration makes is typically difficult to weld in deep crevices or other hard to reach places.

Hence, there is a need for a hand-held laser welding wand that has the capability of conducting laser welding operations in relatively deep crevices or other hard to reach places. The present invention addresses at least this need.

SUMMARY OF THE INVENTION

The present invention provides a hand-held laser welding wand that has the capability of conducting laser welding operations in relatively deep crevices or other hard to reach places.

In one embodiment, and by way of example only, a hand-held laser fusion welding assembly includes a main body and a nozzle assembly. The main body is dimensioned to be grasped by a hand and is adapted to couple to, and receive laser light from, a laser delivery system. The main body has at least a first end and a second end and an internal feeder material supply passage extending therethrough. The nozzle assembly is coupled to the main body and includes a nozzle, a laser extension tip, and a filler media extension tube. The nozzle is disposed adjacent the main body first end and includes an inner surface that defines a laser passage, and a feeder material supply passage extending therethrough. The nozzle laser passage has an aperture through which the laser light from the laser delivery system may pass, and the nozzle feeder material supply passage is in fluid communication with a main body feeder material supply passage. The laser extension tip is coupled to the nozzle laser passage aperture and extends therefrom. The laser extension tip has an inner surface that defines a laser passage through which the laser light that passes through the laser passage aperture may pass. The filler media extension tube is coupled to the nozzle and extends therefrom. The filler media extension tube has an inner surface that defines a filler media passage in fluid communication with the nozzle filler material supply passage.

In another exemplary embodiment, a nozzle assembly for a hand-held laser welding wand includes a nozzle a laser extension tip, and a filler media extension tube. The nozzle is adapted to couple to an end of a hand-held laser welding wand and includes an inner surface that defines a laser passage, and a feeder material supply passage extending therethrough. The nozzle laser passage has an aperture through which laser light from a laser source may pass, and the nozzle feeder material supply passage is adapted to receive a filler media from the hand-held laser welding wand. The laser extension tip is coupled to the nozzle laser passage aperture and extends therefrom. The laser extension tip has an inner surface that defines a laser passage through which the laser light that passes through the laser passage aperture may pass. The filler media extension tube is coupled to the nozzle and extends therefrom. The filler media extension tube has an inner surface that defines a filler media passage in fluid communication with the nozzle filler material supply passage Other independent features and advantages of the preferred welding wand and nozzle assembly will become apparent from the following detailed description, taken in conjunction with the accompanying drawings which illustrate, by way of example, the principles of the invention.

BRIEF DESCRIPTION OF THE DRAWINGS

FIGS. 1-3 are side, front end, and rear end views, respectively, of an exemplary hand-held laser welding wand;

DETAILED DESCRIPTION OF A PREFERRED EMBODIMENT

Figure 4:
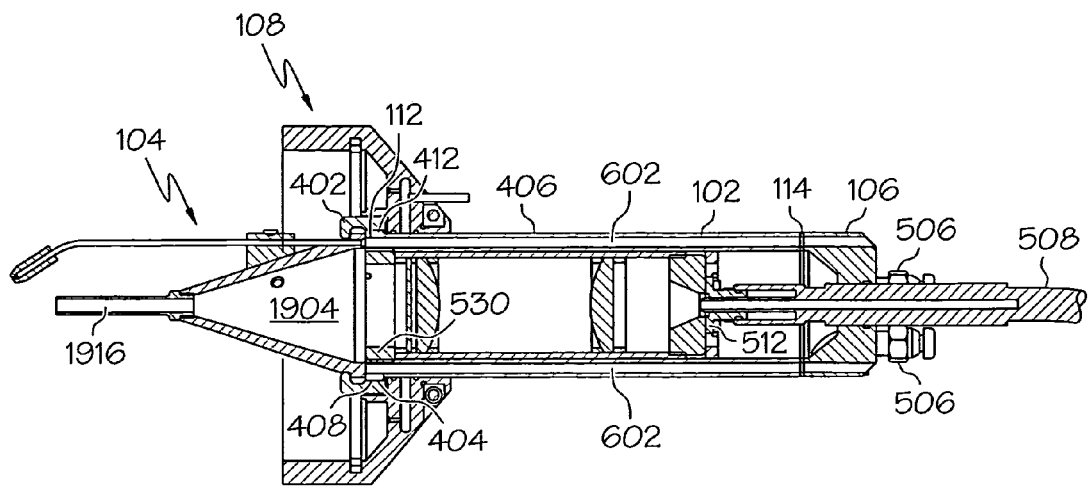
FIG. 4 is a cross section view of the hand-held laser welding wand of FIGS. 1-3, taken along line 4-4 in FIG. 2.

Before proceeding with the detailed description, it should be appreciated that the following detailed description is merely exemplary in nature and is not intended to limit the invention or the application and uses of the invention. Furthermore, there is no intention to be bound by any theory presented in the preceding background or the following detailed description.

Turning now to the description, and with reference first to FIGS. 1-5, an exemplary hand-held laser welding wand 100 is shown, and includes a main body 102, a nozzle assembly 104, an end cap 106, and a gas lens assembly 108. The main body 102, which is preferably configured as a hollow tube, includes a first end 112 (see FIGS. 4 and 5) and a second end 114. The main body 102 additionally includes a plurality of orifices and flow passages. These orifices and flow passages are used to direct various fluids and other media into and through the main body 102. Included among these media are a coolant medium, such as water, an inert gas medium, such as Argon, and a filler material medium, such as powder, wire, or liquid. As will be described further below, some of these orifices and flow passages are in fluid communication with orifices and flow passages in both the nozzle assembly 104 and the end cap 106. The main body orifices and flow passages will now be described. The concomitant filler media orifices and flow passages in the nozzle assembly 104 and end cap 106 will also be described when these components are separately described further below.

Figure 6:
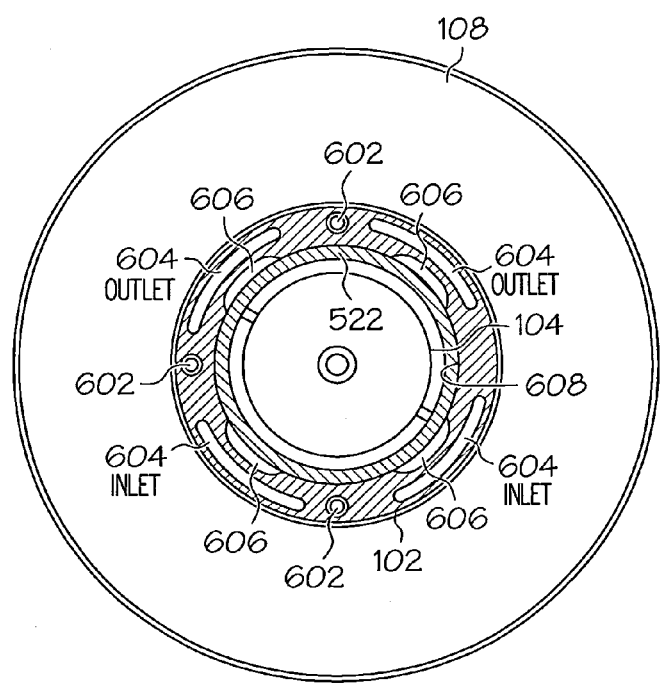
FIG. 6 is a cross section view of the hand-held laser welding wand taken along line 6-6 of FIG. 1.
Figure 7:
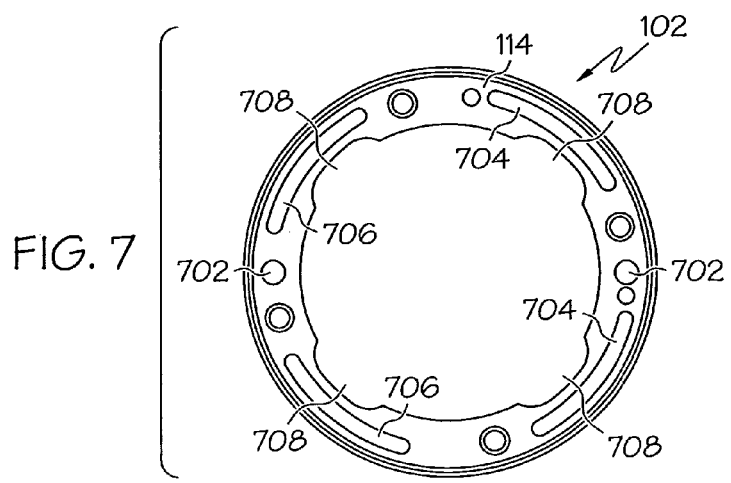
FIGS. 7 and 8 are end views of an exemplary main body portion of the hand-held laser welding wand shown in FIGS. 1-5.
Figure 8:
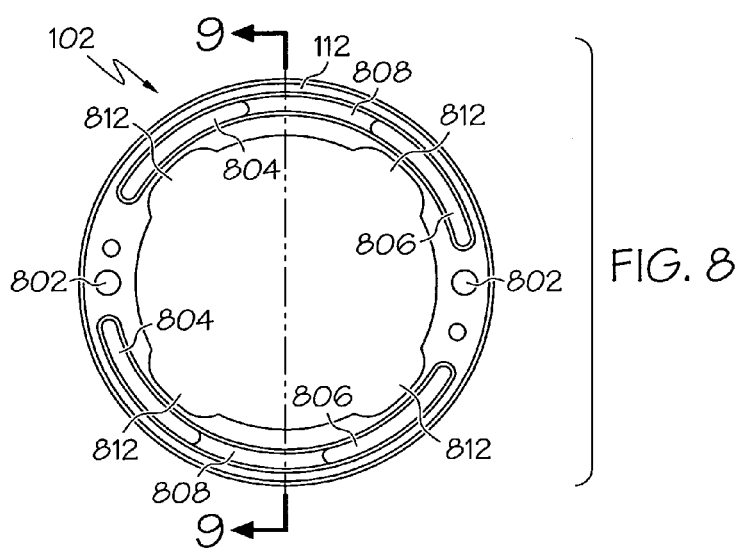

With reference now to FIGS. 6-8, it is seen that the main body 102 includes one or more filler media flow passages 602, one or more coolant flow passages 604, and one or more gas flow passages 606. In the depicted embodiment, the main body 102 includes two filler media flow passages 602, which are disposed on opposing sides of the main body 102. The filler media flow passages 602, as shown most clearly in FIGS. 7 and 8, each include an inlet port 702 (see FIG. 7) and an outlet port 802 (see FIG. 8). The filler media inlet ports 802 are formed in the main body second end 114, and the filler outlet ports 802 are formed in the main body first end 112. The main body filler media flow passages 602 may be used to supply filler media to a work piece.

The main body 102 additionally includes four coolant flow passages 604 that extend partially through the main body 102. Two of the coolant flow passages function as inlet flow passages $604_{INLET}$, and the remaining two coolant flow passages function as outlet flow passages $604_{OUTLET}$. The coolant inlet flow passages $604_{INLET}$ each include an inlet port 704 that is formed in the main body second end 114, and extend partially through the main body 102 to an end 804 (see FIG. 8) that, in the depicted embodiment, is disposed proximate the main body first end 112. The coolant outlet flow passages $604_{OUTLET}$ each include an outlet port 706 that is also formed in the main body second end 114, and extend partially through the main body 102 to an end 806 (see FIG. 8) that, in the depicted embodiment, is also disposed proximate the main body first end 112.

With continued reference to FIG. 8, it is seen that two coolant crossover flow channels 808 are formed proximate the main body first end 112. The crossover flow channels 808 each fluidly communicate a pair of the inlet and outlet flow passage ends 804, 806 with one another. Thus, coolant supplied to the coolant inlet ports 704 flows through the coolant inlet flow passages $604_{INLET}$ toward the inlet flow passage ends 804. When the coolant reaches the inlet flow passage ends 804, the coolant is directed into and through the coolant crossover channels 808, toward the outlet flow passage ends 806, and then into and through the coolant outlet flow passages $604_{OUTLET}$. The coolant then flows out the outlet ports 706 formed in the main body second end 114.

Figure 9:
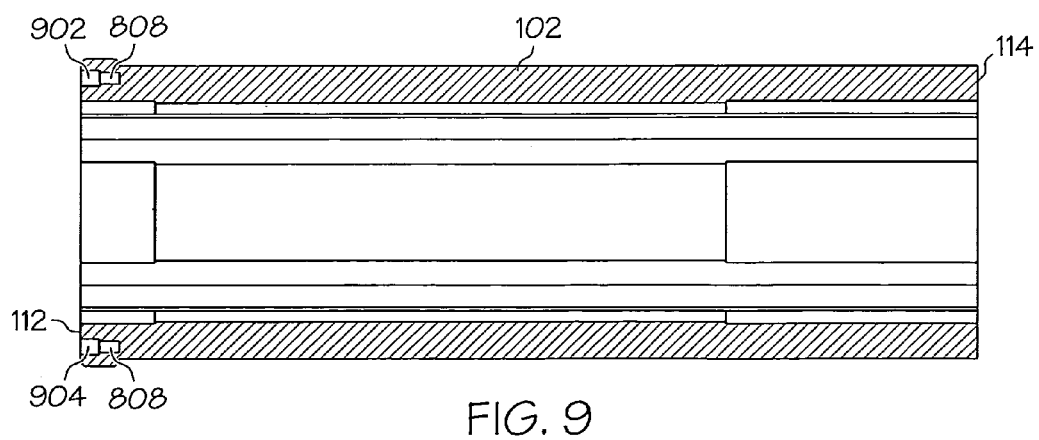
FIG. 9 is a cross section view of the exemplary main body portion shown in FIGS. 7 and 8, taken along line 9-9 in FIG. 8.

It will be appreciated that in order to implement the above-noted coolant circulation flow, the inlet and outlet flow passage ends 804, 806 and the crossover flow channels 808 are preferably sealed. Although this could be done in any one of numerous ways, in the depicted embodiment the inlet and outlet flow passage ends 804, 806 and the crossover flow channels 808 are fixedly sealed. More specifically, and with reference now to FIG. 9 in combination with FIG. 8, it is seen that a pair of grooves 902, 904 are formed in the main body first end 112, and that each pair of inlet and outlet flow passage ends 804, 806 and each of the crossover flow channels 808 are formed in one of the grooves 902, 904. The grooves 902, 904 are each configured to receive a crossover channel cover 502 (see FIG. 5). The crossover channel covers 502 are inserted into one of the grooves 902, 904 and fixedly coupled therein, preferably using a welding process.

It will be appreciated that the crossover channel covers 502, in addition to being configured to fit within one of the grooves 902, 904 and seal the inlet and outlet flow passage ends 804, 806 and the crossover flow channels 808, are also configured to be substantially flush with the main body first end 112 upon being fixed within the grooves 902, 904. It will additionally be appreciated that the above-described configuration and method of fixedly sealing the inlet and outlet flow passage ends 804, 806 and the crossover flow channels 808 is merely exemplary, and that other configurations and methods could be used. For example, the inlet and outlet flow passage ends 804, 806 and crossover flow channels 808 could be integrally formed within the main body 102.

Returning once again to FIGS. 6-8, the gas flow passages 606, at least in the depicted embodiment, are formed into an inner surface 608 of the hollow main body 102. It will be appreciated, however, that the gas flow passages 606 could be formed through the main body 102, similar to the filler media 602 and coolant 604 flow passages. The gas flow passages 606, similar to the filler media flow passages 602, each include an inlet port 708 formed in the main body second end 114, and an outlet port 812 formed in the main body first end 112. Thus, gas supplied to the gas flow passage inlet ports 708 flows through the gas flow passages 606, and out the gas flow passage outlet ports 812. The gas is supplied to the main body gas flow passage inlet ports 708 via the end cap 106, which will now be described.

Referring to FIGS. 4, 5, and 10-13, it is seen that the end cap 106 is coupled to the main body second end 114 via a plurality of end cap fasteners 504. In particular, the end cap fasteners 504 extend, one each, through a plurality of end cap fastener openings 1002 formed through the end cap 106, and into the main body second end 114. In addition to the end cap fastener openings 1002, the end cap 106 also includes two coolant ports 1008, 1010, a gas supply port 1012, a cable opening 1004, and a plurality of filler media supply ports 1006. A barbed fitting 506 (see FIG. 5) is preferably coupled to each of the coolant ports 1008, 1010, and the gas supply port 1012. These barbed fittings 506 may be used to couple the ports 1008-1012 to hoses or other flexible conduits (not shown) that are in fluid communication with a coolant source or a gas source (not shown), as may be appropriate.

The two end cap coolant ports include a coolant inlet port 1008 and a coolant outlet port 1010. The end cap coolant inlet port 1008 is in fluid communication with each of the main body coolant inlet ports 704, via a plurality of coolant inlet flow passages 1302 (see FIG. 13). Similarly, the end cap coolant outlet port 1010 is in fluid communication with each of the main body coolant outlet ports 706, via a plurality of coolant outlet flow passages. For clarity, the end cap coolant outlet flow passages are not illustrated. However, it will be appreciated that these flow passages are configured substantially identical to the coolant inlet flow passages 1302. Thus, coolant supplied to the end cap coolant inlet port 1008 is directed through the end cap coolant flow passages 1302, and into and through the main body coolant flow passages 704. In the main body 102, the coolant flows as described above. The coolant exiting the main body coolant outlet ports 706 is directed into and through the end cap coolant outlet flow passages, and out the end cap coolant outlet port 1010.

Figure 12:
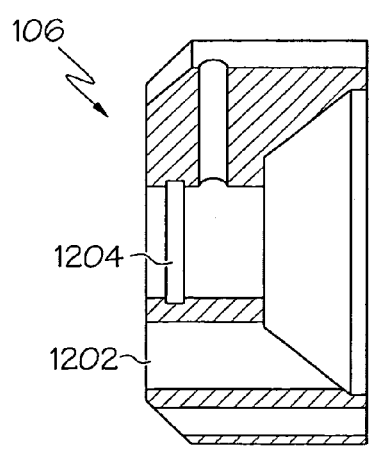
FIGS. 12 and 13 are cross section views of the exemplary end cap taken along lines 12-12 and 13-13 of FIGS. 10 and 11, respectively.
Figure 13:
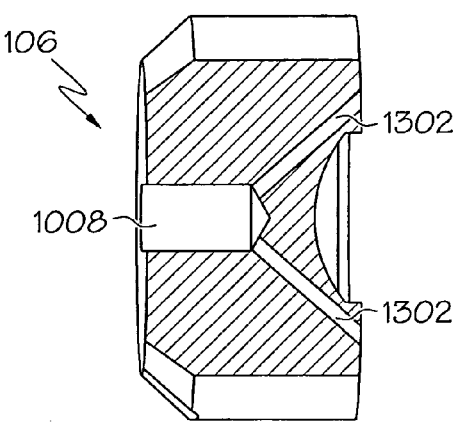
Figure 14:
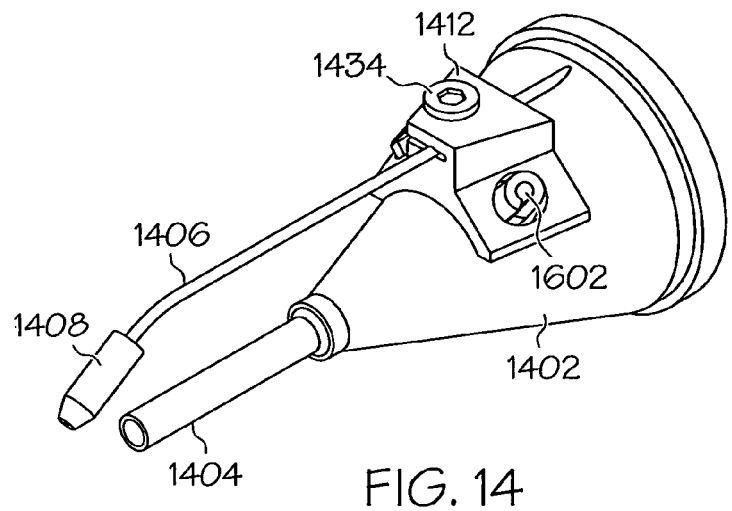
FIGS. 14-18 are perspective, side, top, front, and rear views, respectively, of an exemplary nozzle assembly that that may be used with the hand-held laser welding wand of FIGS. 1-5.

The gas supply port 1012 directs an inert gas such as, for example, Argon, into the main body gas flow passages 806, via an end cap gas flow passage 1202 (see FIG. 12). The end cap gas flow passage 1202, in the depicted embodiment, fluidly communicates the end cap gas supply port 1012 with the end cap cable opening 1004. The end cap cable opening 1004, as was noted above, is in fluid communication with the main body gas flow passage inlet ports 708. Thus, gas supplied to the end cap gas supply port 1012 is directed through the end cap gas flow passage 1202, and into the end cap cable opening 1004. A seal, such as a non-illustrated O-ring seal, prevents the gas entering the end cap cable opening 1004 from flowing back out the end cap 106. The seal is preferably placed in an O-ring groove 1204 formed on an inner surface of the cable opening 1004, and through which the optical cable 508 passes. Thus, the gas directed into the end cap cable opening 1004 is directed into the main body gas flow passage inlet ports 708, through the main body gas flow passages 606, and into the nozzle assembly 104. The gas is then directed out the nozzle assembly 104.

Figure 10:
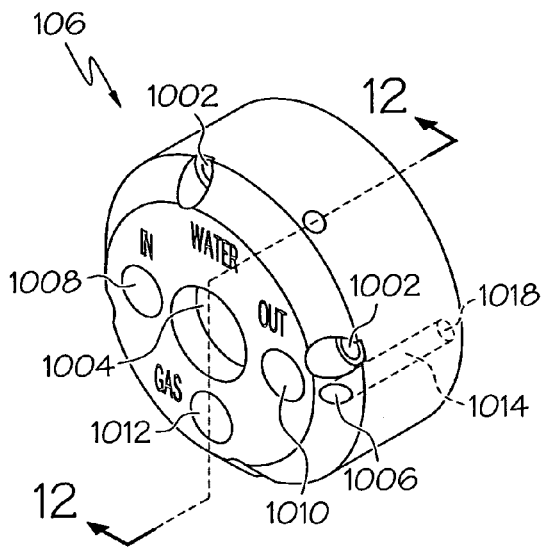
FIGS. 10 and 11 are perspective end views of an exemplary end cap that may be used with the hand-held laser welding wand of FIGS. 1-5.
Figure 11:
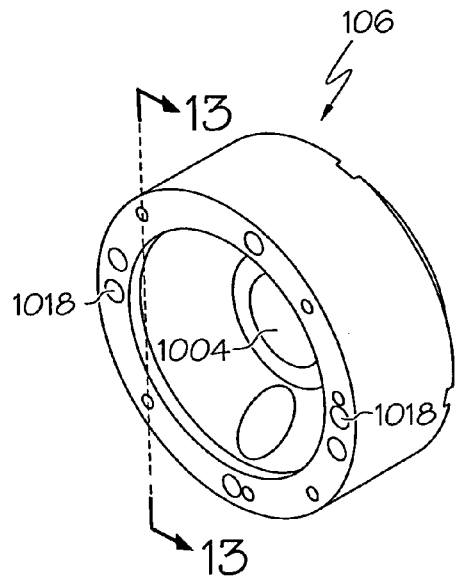

The end cap cable opening 1004 is adapted to receive an optical cable 508 (see FIG. 5) and, as shown most clearly in FIGS. 10 and 11, extends through the end cap 106. When the end cap 106 is coupled to the main body 102, the end cap cable opening 1004 is in fluid communication with the inside of the hollow main body 102 including, as will be further described below, the main body gas flow passage inlet ports 708. In particular, and with quick reference once again to FIGS. 4 and 5, the optical cable 508 is inserted into and through the end cap cable opening 1004, and is coupled to an optical receptacle 512 mounted within the main body 102. The optical cable 508 is used to transmit laser light from a laser source (not shown) into the main body 102. An optics assembly 520 is mounted within the main body 102 and is used to appropriately collimate and focus the laser light transmitted through the optical cable 508 and receptacle 512. As will be described further below, the laser light is focused and collimated such that when the laser light passes through the nozzle assembly 104 it is focused on a point in front of the nozzle assembly 104. As may be seen by referring to FIG. 3, the optics assembly 520 also encloses the main body gas flow passages 606 that are formed on the main body inner surface 608. A brief description of an embodiment of the optics assembly 520 will now be provided. In doing so, reference should be made to FIG. 5.

The optics assembly 520 includes a lens tube 522, a first lens 553, a second lens 526, an optical adjustment screw 528, and a retaining ring stop 530. The lens tube 522 is preferably constructed of, or coated with, a material that is optically inert. For example, in the depicted embodiment, the lens tube 522 is constructed of black anodized aluminum. The first 553 and second 526 lenses are each mounted within the lens tube 522 via appropriate mounting hardware. In particular, each of the lenses 553, 526 is mounted between first and second retaining rings 532, 534. In addition, a lens cover 536 and lens cover spacer 538 are disposed in front of the second lens 526, providing physical protection for the second lens 526. The retaining ring stop 530, as its name connotes, retains the optics assembly 520 within the main body 102. In a particular preferred embodiment, the inner surface of the lens tube 522 and the outer surface of the retaining ring stop 530 are each threaded. Thus, removal of the retaining ring stop 530 allows the lenses 524, 526 to be readily removed from the lens tube 522.

With the above described configuration, laser light transmitted through the optical cable 508 and receptacle 512 passes through the first lens 553, which refracts the laser light so that it travels substantially parallel to the interior surface of the lens tube 522. The parallel laser light then passes through the second lens 526, which focuses the laser light to a point in front of the nozzle assembly 104. It will be appreciated that the location of the point in front of the nozzle assembly 104 to which the laser light is focused is a function of the focal length of the second lens 526, and its mounting location within the lens tube 522, which is determined by the second lens' retaining rings 532, 534. It will additionally be appreciated that the spacing of the first lens 553 relative to the optical receptacle 222 affects the collimation of the optics assembly 520. Hence, the optical adjustment screw 528, to which the optical receptacle 512 is coupled, is movably mounted within the lens tube 522, and may be used to adjust the spacing between the first lens 553 and the optical receptacle 222. In a particular preferred embodiment, the inner surface of the lens tube 522 and the outer surface of the optical adjustment screw 528 are each threaded to provide this adjustability function.

Returning once again to the description of the end cap 106, and with reference returned to FIGS. 10 and 11, it is seen that, at least in the depicted embodiment, the end cap 106 includes two filler media flow passages 1014 (only one shown in phantom in FIG. 10), each of which is in fluid communication with one of the main body filler media flow passages 702. The end cap filler media flow passages 1014 each include an inlet port 1006 and an outlet port 1018. When the end cap 106 is coupled to the main body 102, each end cap filler media outlet port 1018 is collocated with one of the main body filler media flow passage inlet ports 702. The end cap filler media inlet ports 1006 may be coupled to receive any one of numerous types of filler media including, but not limited to, those delineated above. The particular filler media used may be fed into one or more of the end cap filler media inlet ports 1006 either manually, or the filler media may be fed automatically from a filler media feed assembly (not shown).

The filler media supplied to the laser welding wand 100 may flow into and through each of the end cap 1014 and main body 602 filler media flow passages via a plurality of tubes. In particular, and with a quick reference once again to FIG. 5, it is seen that a plurality of filler media liner tubes 550 are provided. These filler media liner tubes 550 may be inserted, one each, through one of the end cap filler media flow passages 1014, and into the main body filler media flow passages 702. The filler media liner tubes 550 further guide the filler media into and through the end cap 106 and main body 102 and, as will be described further below, into the nozzle assembly 104. The filler media liner tubes 550 also protect each of the filler media openings and flow passages against any erosion that could result from filler media flow or movement through the openings and flow passages. Although use of the filler media liner tubes 550 is preferred, it will be appreciated that the wand 100 could be used without the filler media liner tubes 550.

It will additionally be appreciated that although the end cap 106 and main body 102, at least in the depicted embodiment, both include a plurality of filler media flow passages, each could include more or less than this number of filler media flow passages. Indeed, when the nozzle assembly 104, which will now be described in more detail, is coupled to the main body 102, only one of the filler media flow passages in the main body 102 and end cap 106 will typically be used.

Figure 5:
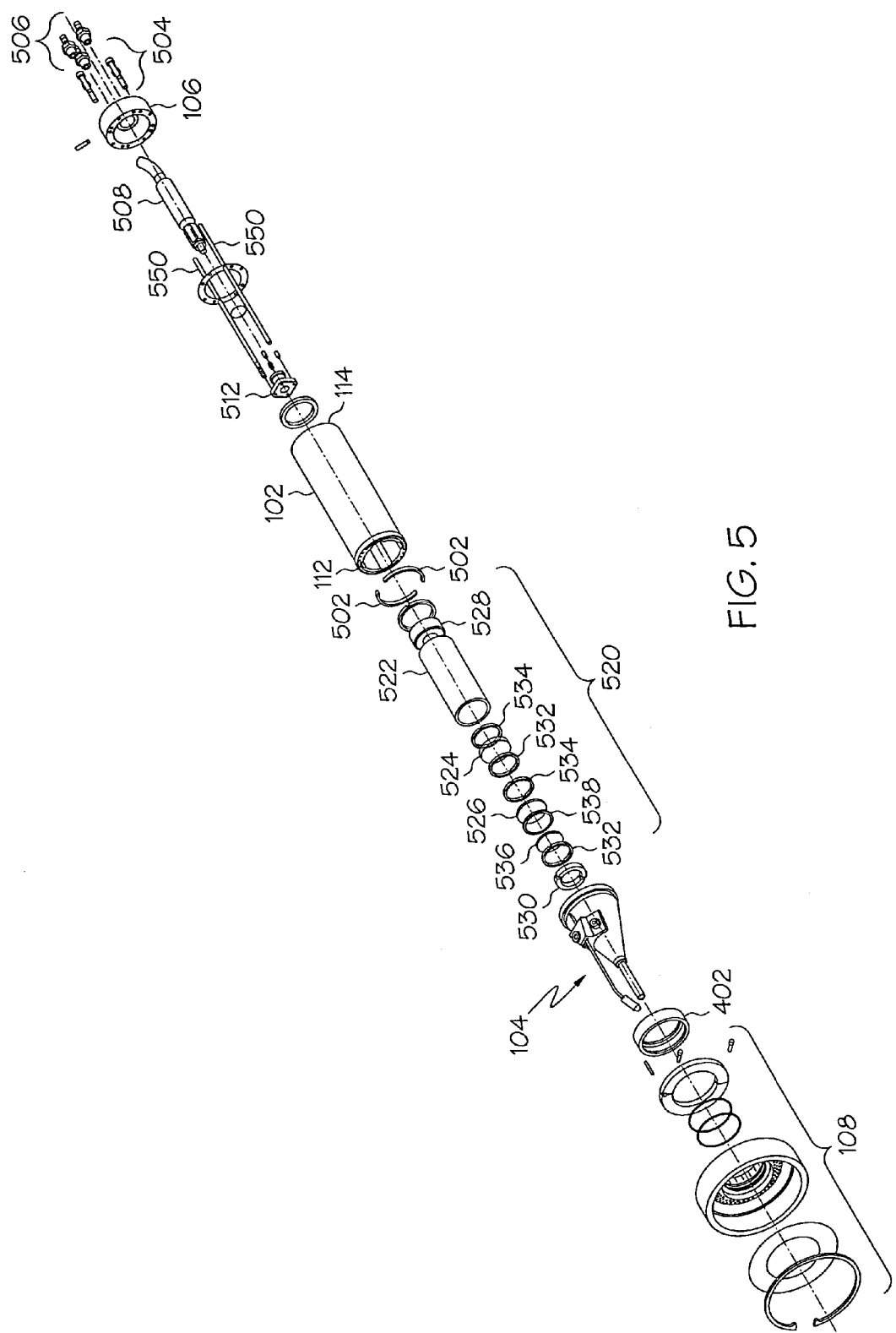
FIG. 5 is a perspective exploded view of the hand-held laser welding wand of FIGS. 1-4.

With reference returned now to FIGS. 4 and 5, it is seen that the nozzle assembly 104 is coupled to the main body first end 112 via a threaded nozzle retainer ring 402. More specifically, in the depicted embodiment the main body 102 has a plurality of threads 404 formed on its outer surface 406 adjacent the main body first end 112. Similarly, the nozzle retainer ring 402 has a plurality of threads 408 formed on its inner surface 412 that mate with the main body threads 404. Thus, the nozzle assembly 104 is coupled to the main body 102 by abutting the nozzle assembly 104 against the main body first end 112, sliding the nozzle retainer ring 402 over the nozzle assembly 104, and threading the nozzle retainer ring 402 onto the main body 102. It will be appreciated that the nozzle assembly 104 could be coupled to the main body first end 112 in a different manner. For example, the nozzle assembly 104 and main body 102 could be configured so that the nozzle assembly 104 is threaded directly onto the main body first end 112.

Turning now to FIGS. 14-19 it is seen that the nozzle assembly 104 includes a nozzle 1402, a laser extension tip 1404, filler media extension tube 1406, an extension tube tip 1408, and an extension tube bracket 1412. The nozzle 1402, as shown more clearly in FIGS. 18 and 19, includes an inner surface 1902 that defines a laser/gas passage 1904, a filler media flow passage 1906, and a pair of fastener openings 1908. The laser/gas passage 1904 includes an aperture 1912 into which the laser extension tip 1404 is preferably inserted. It will be appreciated, however, that this is merely exemplary and that the laser extension tip 1404 could be coupled to the nozzle 1402 using any one of numerous other suitable techniques including, for example, various types of fasteners.

The laser extension tip 1404 includes an inner surface 1914 that defines a laser passage 1916. When the laser extension tip 1404 is inserted into the nozzle aperture 1912 (or otherwise coupled to the nozzle 1402), the laser passage 1916 is in fluid communication with the laser/gas passage 1904. As a shown more clearly in FIGS. 1 and 4, when the nozzle assembly 104 is coupled to the main body 102, the laser/gas passage 1904 and nozzle aperture 1912 are in fluid communication with the inside of the hollow main body 102 and the main body gas flow passage outlet ports 812. Thus, laser light and gas pass through the nozzle aperture 1912 and the laser extension tip 1404 during laser welding operations.

The nozzle filler media flow passage 1906, in conjunction with the filler media extension tube 1406 and one of the main body filler media flow passages 602, is used to deliver filler media to a work piece (not shown). More specifically, and as shown more clearly in FIG. 4, when the nozzle assembly 104 is coupled to the main body 102, the nozzle filler media flow passage 1906 is in fluid communication with one of the main body filler media flow passages 602, and is preferably dimensioned to receive the filler media extension tube 1406. In particular, the nozzle filler media flow passage 1906 and filler media extension tube 1406 are preferably dimensioned to allow the filler media extension tube 1406 to be snugly inserted into the nozzle filler media flow passage 1906. The filler media extension tube 1406 includes a first end 1918, a second end 1922, and an inner surface 1923 that defines a filler media flow passage 1924 between the first and second ends 1918, 1922. Thus, filler media that is supplied through the main body filler media flow passage 602, flows or extends into and through the nozzle filler media supply passage 1906 and into and through the filler media extension tube 1406.

The extension tube tip 1408 is coupled to the filler media extension tube second end 1922, and includes an inner surface 1926 that defines a passage 1928. Preferably, the filler media extension tube second end 1922 and the extension tube tip inner surface 1926 are dimensioned to allow the filler media extension tube 1404 to be snugly inserted into the extension tube tip passage 1928. It will be appreciated that use of the extension tube tip 1408 is preferable, but that the nozzle assembly 104 could be implemented without it. If it is included, however, feeder material that passes into and through the filler material extension tube 1406 is discharged from the filler material extension tube 1406 via the extension tube tip 1408.

Figure 20:
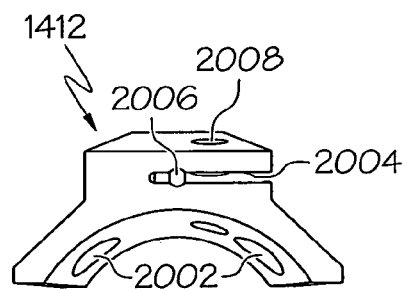
FIG. 20 is a front perspective view of an exemplary bracket assembly that may form part of the nozzle assembly of FIGS. 14-19.

The filler media extension tube 1406 could be supported solely by the nozzle filler media flow passage 1906. However, in the preferred embodiment, and as shown in FIGS. 14-19, the filler media extension tube 1406 is supported by, and secured within the nozzle filler media flow passage 1906 by, the extension tube bracket 1412. The extension tube bracket 1412 is coupled to the nozzle 1402 and is secured thereto via a pair of fasteners 1602 (see FIG. 16). More specifically, and as shown in FIG. 20, the extension tube bracket 1412 includes a pair of fastener openings 2002, each of which, when the bracket is mounted on the nozzle 1402, is collocated with one of the nozzle fastener openings 1908. Each of the fasteners 1602 passes through one of the bracket fastener openings 2002, and into one of the nozzle fastener openings 1908, thereby securing the extension tube bracket 1412 to the nozzle 1402.

As FIG. 20 also shows, the extension tube bracket 1412 additionally has a slot 2004 formed therein that has a rounded section 2006 disposed along an axis of symmetry. A clamp fastener opening 2008 is disposed adjacent the rounded section 2006 and extends through the bracket 1412. The filler media extension tube 1406 passes through the rounded section 2006, and a clamp fastener 1434 (see FIG. 14) extends through the clamp fastener opening 2008. The clamp fastener 1434 is tightened sufficient to securely hold the filler media extension tube 1406 in place.

As was previously noted, the optics assembly 520 allows the laser light to be focused and collimated such that when the laser light passes through the nozzle assembly 104 it is focused on a point (e.g., a focal point) in front of the nozzle assembly 104. More specifically, and as shown most clearly in FIG. 15, the laser light is focused and collimated such that the laser light focal point 1502 is at a location 1504 in front of the laser extension tip 1404. It will be appreciated that the length of the laser extension tip 1404 may vary, and may be selected from a plurality of laser extension tips 1404 of differing lengths, to match a desired focal point location 1504.

Figure 15:
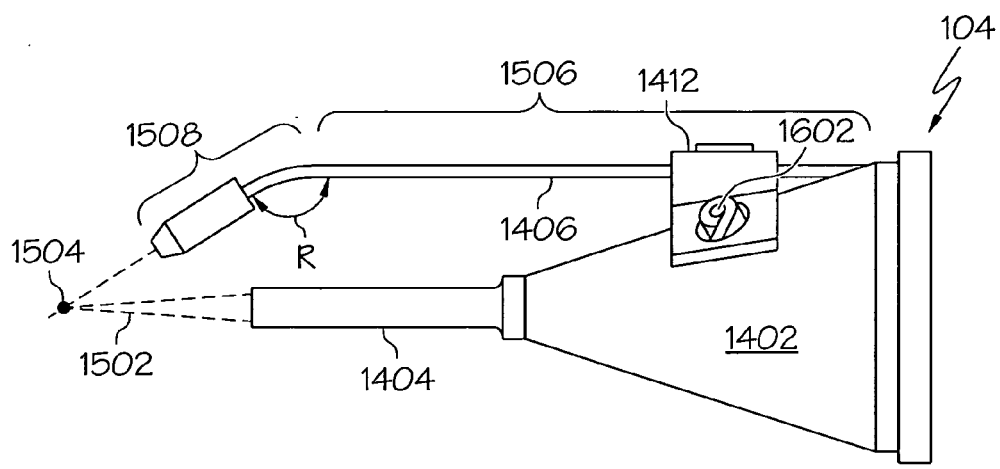
Figure 16:
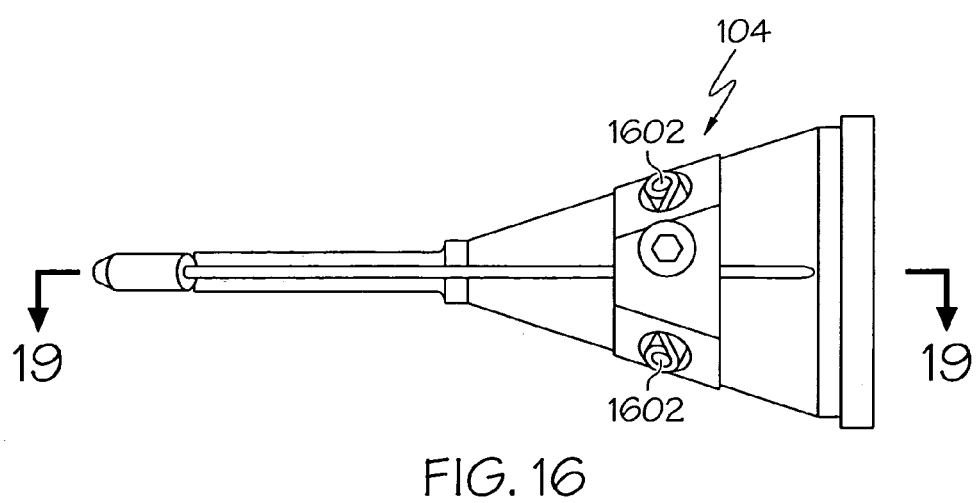
Figure 19:
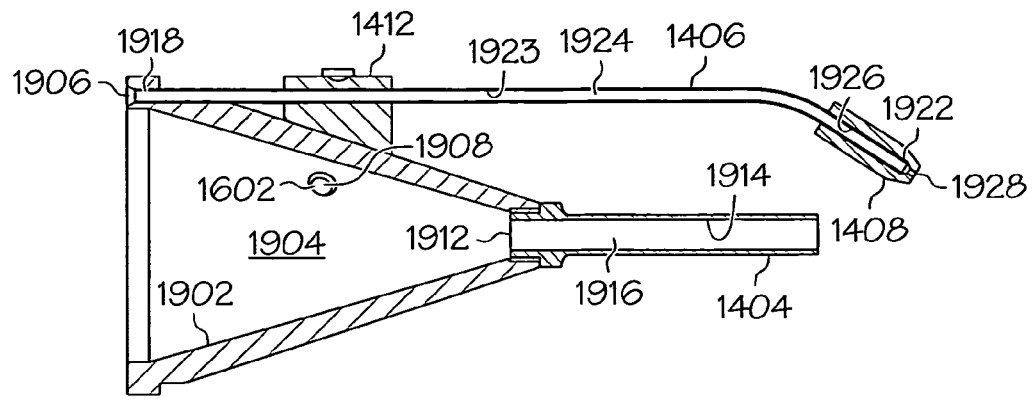
FIG. 19 is a cross section view of the exemplary nozzle assembly taken along line 19-19 of FIG. 16.
Figure 17:
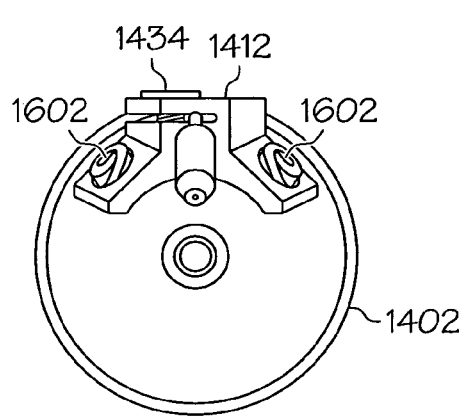
Figure 18:
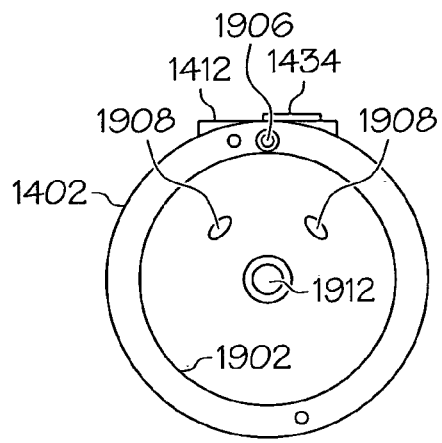

Moreover, as FIG. 15 additionally shows, the filler media extension tube 1406 is configured to direct filler media toward the focal point location 1504, so that the filler media will intersect the focal point location 1504. To do so, the filler media extension tube 1406 preferably includes a straight section 1506 and an angled section 1508 that is bent, at a bend radius (R), away from the straight section 1506. It will be appreciated that the length of the laser extension tip 1404 may vary, and that the bend radius (R) may additionally (or instead) be varied, to match the focal point location 1504. Thus, similar to the laser extension tip 1404, the filler media extension tube 1406 may be selected from a plurality of filler media extension tubes 1406 to match the focal point location 1504.

The gas lens assembly 108 is additionally coupled to the wand 100. The gas lens assembly 108 is used to reflect laser light that may be reflected off a work piece back toward the wand 100, and to provide an inert gas shield around a weld pool on a work piece. A description of the specific configuration of the gas lens assembly is not needed, and will thus not be further described in detail.

The nozzle assembly 104, and in particular the laser extension tip 1404 and the feeder material extension tip 1406, is configured in a manner that provides the hand-held laser welding wand 100 with the capability of conducting laser welding operations in relatively deep crevices or other hard to reach places.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A hand-held laser fusion welding assembly, comprising:
   a main body dimensioned to be grasped by a hand and adapted to couple to, and receive laser light from, a laser delivery system, the main body having at least a first end and a second end and an internal feeder material supply passage extending therethrough; and
   a nozzle assembly coupled to the main body and including:
      a nozzle disposed adjacent the main body first end and including an inner surface that defines a laser passage, and a feeder material supply passage extending therethrough, the nozzle laser passage having an aperture through which the laser light from the laser delivery system may pass, the nozzle feeder material supply passage in fluid communication with a main body feeder material supply passage,
      laser extension tip coupled to the nozzle laser passage aperture and extending therefrom, the laser extension tip having an inner surface that defines a laser passage through which the laser light that passes through the laser passage aperture may pass, and
      a filler media extension tube coupled to the nozzle and extending therefrom, the filler media extension tube having an inner surface that defines a filler media passage in fluid communication with the nozzle filler material supply passage.

2. The assembly of claim 1, wherein the filler media extension tube includes a first end and a second end, the first end coupled to the nozzle, and wherein the assembly further comprises:
   an extension tip coupled to the filler media extension tube second end and having an inner surface that defines a passage in fluid communication with the extension tube filler media passage.

3. The assembly of claim 2, wherein the extension tip passage is dimensioned to receive the filler media extension tube second end therein.

4. The assembly of claim 3, wherein the extension tip surrounds the filler media extension tube second end and a section of the filler media extension tube.

5. The assembly of claim 1, further comprising:
   a bracket coupled between the nozzle and the filler media extension tube.

6. The assembly of claim 5, wherein the bracket at least partially surrounds a section of the filler media extension tube.

7. The assembly of claim 6, further comprising:
   a plurality of fastener openings formed in the nozzle;
   a plurality of fastener openings formed in the bracket; and a plurality of fasteners, each fastener extending through one of the bracket fastener openings and into one of the nozzle fastener openings.

8. The assembly of claim 1, further comprising:
an optics assembly mounted within the main body and configured to focus the laser light from the laser delivery system on a focal point located a predetermined distance in front of the laser nozzle aperture.

9. The assembly of claim 8, wherein:
the laser extension tip is selected from a plurality of laser extension tips, each laser extension tip having a different length; and
the laser extension tip that is coupled to the nozzle is selected based on the predetermined distance in front of the laser nozzle aperture at which the focal point is located.

10. The assembly of claim 8, wherein the filler media extension tube is configured to direct filler media discharged therefrom toward the focal point.

11. The assembly of claim 10, wherein:
the filler media extension tube is selected from a plurality of filler media extension tubes, each filler media extension tube having a different configuration; and
the filler media extension tube that is coupled to the nozzle is selected based on the predetermined distance in front of the laser nozzle aperture at which the focal point is located.

12. The assembly of claim 11, wherein at least the first lens is movably mounted within the lens conduit, and wherein the assembly further comprises:
a receptacle assembly mounted within the main body adjacent the lens conduit first end, the receptacle assembly adapted to receive an optical cable through which the laser light from the laser delivery system is transmitted; and
an optical adjustment screw movably mounted within the lens conduit adjacent the first lens, the optical adjustment screw configured to adjust a spacing between the first lens and the receptacle assembly, whereby the collimation of the delivered laser light is adjustable.

13. The nozzle assembly of claim 12, further comprising:
a bracket coupled between the nozzle and the filler media extension tube.

14. The nozzle assembly of claim 13, wherein the bracket at least partially surrounds a section of the filler media extension tube.

15. The nozzle assembly of claim 14, further comprising:
a plurality of fastener openings formed in the nozzle;
a plurality of fastener openings formed in the bracket; and
a plurality of fasteners, each fastener extending through one of the bracket fastener openings and into one of the nozzle fastener openings.

16. The nozzle assembly of claim 12, wherein the filler media extension tube includes a first end and a second end, the first end coupled to the nozzle, and wherein the assembly further comprises:
an extension tip coupled to the filler media extension tube second end and having an inner surface that defines a passage in fluid communication with the extension tube filler media passage.

17. The nozzle assembly of claim 16, wherein the extension tip passage is dimensioned to receive the filler media extension tube second end therein.

18. The nozzle assembly of claim 17, wherein the extension tip surrounds the filler media extension tube second end and a section of the filler media extension tube.

19. The assembly of claim 8, wherein the optics assembly comprises:
a lens conduit having at least a first end and a second end;
a first lens mounted within the lens conduit adjacent the lens conduit first end, the first lens configured to collimate the laser light from the laser delivery system; and
a second lens mounted within the lens conduit adjacent the lens conduit second end, the second lens configured to focus the collimated laser light on the point in front of the nozzle aperture.

20. A nozzle assembly for a hand-held laser welding wand, comprising:
a nozzle adapted to couple to an end of a hand-held laser welding wand and including an inner surface that defines a laser passage, and a feeder material supply passage extending therethrough, the nozzle laser passage having an aperture through which laser light from a laser source may pass, the nozzle feeder material supply passage adapted to receive a filler media from the hand-held laser welding wand;
a laser extension tip coupled to the nozzle laser passage aperture and extending therefrom, the laser extension tip having an inner surface that defines a laser passage through which the laser light that passes through the laser passage aperture may pass; and
a filler media extension tube coupled to the nozzle and extending therefrom, the filler media extension tube having an inner surface that defines a filler media passage in fluid communication with the nozzle filler material supply passage.

* * * * *